US007338429B2

(12) United States Patent
Palasram et al.

(10) Patent No.: US 7,338,429 B2
(45) Date of Patent: Mar. 4, 2008

(54) METHOD FOR DIRECT SOLIDIFICATION AND STABILIZATION OF LIQUID HAZARDOUS WASTES CONTAINING UP TO 100,000 MG/L OF ARSENIC

(75) Inventors: Patil Mahendra Palasram, Maharashtra (IN); Deshkar Ashok Mahadeorao, Maharashtra (IN); Deshpande Sarvottam Damodar, Maharashtra (IN); Chakrabarti Tapan, Maharashtra (IN); Devotta Sukumar, Maharashtra (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 11/509,299

(22) Filed: Aug. 23, 2006

(65) Prior Publication Data

US 2007/0219403 A1 Sep. 20, 2007

(30) Foreign Application Priority Data

Mar. 20, 2006 (IN) .................................. 731/2006

(51) Int. Cl.
*B09B 1/00* (2006.01)

(52) U.S. Cl. ...................................................... 588/256

(58) Field of Classification Search ................. 588/256
See application file for complete search history.

(56) References Cited

U.S. PATENT DOCUMENTS

| | | | | |
|---|---|---|---|---|
| 4,017,417 A | | 4/1977 | Clark et al. | 588/3 |
| 5,098,612 A | | 3/1992 | Rowsell | 588/4 |
| 5,304,709 A | * | 4/1994 | Babcock et al. | 588/257 |
| 5,304,710 A | | 4/1994 | Kigel et al. | 588/319 |
| 5,307,709 A | | 5/1994 | Bareis et al. | 74/570.2 |
| 5,443,177 A | | 8/1995 | Crayne et al. | 220/62.15 |
| 5,683,344 A | | 11/1997 | Channell et al. | 588/257 |
| 5,840,194 A | * | 11/1998 | Yokose et al. | 210/710 |
| 6,174,275 B1 | | 1/2001 | Janusa | 588/257 |

OTHER PUBLICATIONS

Palfy et al., "Processing of Arsenic Wastes by Precipitation and Solidification," Waste Management, vol. 19, pp. 55-59, 1999.
Leist et al., "The Management of Arsenic Wastes: Problems and Prospects", Journal of Hazardous Materials, B76, pp. 125-138, 2000.
Shields et al., "Treatment Technologies for Wastes and Environmental Media Containing Arsenic," Proceedings of U.S. EPA Arsenic Workshop. May 1-3, 2001, Denver, CO.
USEPA "Arsenic Treatment Technologies for Soil, Wastes and Water", United States Environmental Protection Agency, EPA-542-02-004.

* cited by examiner

*Primary Examiner*—John Kreck
(74) *Attorney, Agent, or Firm*—DLA Piper US LLP

(57) ABSTRACT

The present invention relates to a method for direct treatment of liquid wastes containing up to 10% or 100,000 mg/L of arsenic by solidification/stabilization in a relatively cost effective and environmentally safe. The method also permits the simultaneous utilization other heavy metal bearing wastes (such as spent catalysts), in the solidification/stabilization of liquid wastes containing very high concentration of arsenic. It also deals with a method for converting liquid wastes containing very high concentration of arsenic into a non-leachable solid residue ready for final disposal. The direct treatment of liquid wastes containing very high concentration of arsenic by solidification/stabilization will eliminate the additional stage of converting liquid wastes to solid or semi-solid form prior to solidification/stabilization, thereby significant reduction in overall cost associated with arsenic waste treatment.

15 Claims, No Drawings

METHOD FOR DIRECT SOLIDIFICATION AND STABILIZATION OF LIQUID HAZARDOUS WASTES CONTAINING UP TO 100,000 MG/L OF ARSENIC

CROSS REFERENCE TO RELATED APPLICATION

This application is a utility application and claims the benefit under 35 USC § 119(a) of India Application No. 731/DEL/2006 filed Mar. 20, 2006. This disclosure of the prior application is considered part of and is incorporated by reference in the disclosure of this application.

FIELD OF INVENTION

The present invention relates to a method for direct solidification and stabilization of liquid hazardous wastes containing up to 100,000 mg/L of arsenic.

More particularly, it relates to a method for direct solidification and stabilization of liquid hazardous wastes containing arsenic up to 100,000 mg/L in liquid wastes into a non-leachable solid material conforming to the USEPA TCLP criteria and ready for final disposal to landfills or containment facilities.

BACKGROUND AND PRIOR ART OF INVENTION

Arsenic is one of the most toxic elements and is a known human carcinogen. Because of high toxicity associated with arsenic, the industrial uses of arsenic have been drastically curtailed in recent times thereby reducing the quantum of arsenic waste generation. However, the historic operations have lead to generation of significant quantities of arsenic wastes, which are still stored at many production facilities, where arsenic was used as one of the raw materials. The most significant among such production facilities are nitrogenous fertilizer-manufacturing complexes, wherein the well-known Giammarco-Vetrocoke process was predominantly employed during the manufacture of ammonia from feedstock (such as natural gas and naphtha). In the Giammarco-Vetrocoke process, carbon dioxide is removed from ammonia stream by scrubbing with a proprietary solution containing potassium carbonate, arsenic and other activators. However, due to several operational problems, and very high toxicity associated with arsenic, most of the nitrogenous fertilizer manufacturing complexes have switched over from the Giammarco-Vetrocoke process to other non-arsenic based processes since last one decade. The spent absorbing solution from the Giammarco-Vetrocoke process containing very high concentration of arsenic (up to 10%) was discarded as hazardous waste. Such wastes may be stored at many nitrogenous fertilizer-manufacturing complexes either in liquid form or in solid/semi-solid form.

The other industrial sources of arsenic wastes include production of pesticides, herbicides, or veterinary pharmaceuticals, wood preserving operations, non-ferrous metallurgical industries (such as copper smelters) and development of semiconductor material for the electronics industry. The liquid and solid wastes generated from these sources also contain very high concentration of arsenic.

Since recycling of arsenic-containing materials is technically challenging and cost prohibitive, there is a great demand for the development of effective treatment technologies for the safe disposal of arsenic contaminated hazardous wastes. With the advent of stringent environmental laws and the realization that arsenic containing hazardous wastes can cause severe damage to human, plant and animal life, many methods have been proposed for treatment and disposal of arsenic in various environmental media.

Reference may be made to the report EPA-542-02-004 ("*Arsenic Treatment Technologies for Soil, Wastes and Water*", EPA-542-02-004, September 2002) by United States Environmental Protection Agency (USEPA), wherein an exhaustive review of arsenic treatment technologies applicable to water and wastewater have been presented. The treatment technologies for water and wastewater include precipitation/co-precipitation, membrane filtration, adsorption, ion exchange, and permeable reactive barriers. However, the maximum initial concentration of arsenic treated by these methods was 3,300 mg/L. Further, most of these methods generate a solid/semi-solid residue or liquids containing high concentrations of arsenic which are further required to be treated and disposed off.

Reference may again be made to the report EPA-542-02-004, ("Arsenic Treatment Technologies for Soil, Wastes and Water", EPA-542-02-004, September, 2002) by the United States Environmental Protection Agency (USEPA), wherein an exhaustive review of arsenic treatment technologies applicable to arsenic wastes have been presented. The treatment technologies for arsenic wastes include solidification and stabilization, vitrification, acid extraction for arsenic, and pyro-metallurgical recovery for arsenic. Among these technologies, the most effective, least expensive and frequently used technology for arsenic wastes is solidification and stabilization. The solidification/stabilization technology generates a solidified mass that does not require further treatment for disposal. The review indicates that solidification/stabilization technology have been applied to the solids/semisolid wastes having high arsenic concentrations (up to 750,000 mg/kg) but having relatively low leachability [up to 4,390 mg/L as determined by USEPA's Toxicity Characteristics Leaching Procedure (TCLP)]. Most of the wastes mentioned in the review were generated during the treatment of liquid wastes containing high concentration of arsenic. The transformation of arsenic form liquid phase (by precipitation/co-precipitation, adsorption, ion exchange) to solid/semi-solid phase (sludges) and further treatment of arsenic in solid/semi-solid phase by solidification and stabilization involve two stages, thereby increasing the overall cost of treatment. No attempts have been made in the past to directly treat the liquid wastes (such as the spent absorbing solution from the Giammarco-Vetrocoke process) containing very high concentration of arsenic (up to 100,000 mg/L) by solidification solidification/stabilization. The direct treatment of liquid wastes containing very high concentration of arsenic by solidification/stabilization will eliminate the additional stage of converting liquid wastes to solid or semi-solid form, thereby significant reduction in overall cost associated with arsenic treatment.

Reference may also be made to the U.S. Pat. No. 5,098,612 wherein a method of preparing solidified and stabilized hazardous or radioactive liquids by direct treatment with solidification and stabilization was presented. However, the prime objective of this method was to reduce the dimensional expansion of solid mass during the solidification. The method involves addition of solidifying composition comprising a mixture of clay (selected from the group consisting of sodium montmorillonite, attapulgite, sepiolite, and mixtures thereof), and the silicone coated cementitious material, to the aqueous liquid or sludge in appropriate ratios to produce an unpourable, free standing solid mass. Though the method was applied to a wide variety of liquid wastes (containing organics, inorganics, metals and radioactive substances), the maximum concentration of contaminants in general, and arsenic in particular, was not discussed. Further, there is no discussion on the leachability of contaminants from the solidified and stabilized mass obtained by this method. The solidified and stabilized wastes must meet the USEPA TCLP criteria prior to the final disposal, such as landfills. In this context reference may also be made to a review by Liest et al., (Journal of Hazardous Materials B76, 2000, 125-138) wherein a number of solidification/solidification processes for treatment of arsenic have been presented. These include fixation of arsenic with various combinations of Portland cement, iron, lime, fly ash, slags and silicates. Since arsenic is present in both trivalent as well as pentavalent form, the trivalent arsenic, which is highly soluble in water, needs to be converted to an insoluble form such as calcium or ferric arsenate. Thus, use of cement and/or clay alone will not effectively solidify and stabilize the liquid wastes containing high concentrations of arsenic.

The reference may also be made to the study by Palfy et al. (P. Palfy, E. Vircikova, L. Molnar; "*Processing of arsenic wastes by precipitation and solidification", Waste Management*, 19, 55-59, 1999) wherein a process for solidification and stabilization of arsenic sludge accumulated in the reaction tower during the refining of carbon dioxide in the Giammarco-Vetrocoke process was presented. Though, the arsenic waste studied by Palfy et al., 1999 contain high concentration of arsenic (163,000 mg/kg), the concentration of arsenic in the leachate is only 6,430 mg/L.

The reference may also be made to the presentation by Shields et al., 2001 (P. J. Shields, S. Nagaraja, L. D. Fiedler; "*Treatment Technologies for Wastes and Environmental Media Containing Arsenic*" U.S. EPA Arsenic Workshop. May 1-3, 2001, Denver, Colo.) Wherein a summary of treatment performance of solidification/stabilization for arsenic wastes was discussed. Though, the concentration of arsenic in the wastes was 750,000 mg/kg, the maximum leachable concentration of arsenic was only 100 mg/L.

Thus, the solidification/stabilization method discussed by Palfy et al., 1999 and Shields et al., 2001 is not applicable directly to the liquid wastes containing high concentration of arsenic (up to 100,000 mg/L).

The widely practiced, conventional method for treatment of liquid wastes containing very high concentration of arsenic involve transformation of arsenic form liquid phase (by precipitation/co-precipitation, adsorption, ion exchange etc.) to solid/semi-solid phase (sludges) and immobilization of arsenic in solid/semi-solid phase by solidification and stabilization. The major drawback of this method is the involvement of an additional stage of transforming arsenic from liquid phase to solid phase prior to solidification/stabilization, thereby increasing the overall cost of treatment of liquid arsenic wastes. The present invention thus deals with direct solidification and stabilization of liquid wastes containing very high concentration of arsenic, wherein an intermediate stage of transforming arsenic from liquid phase to solid/semi-solid phase is eliminated.

OBJECTS OF THE INVENTION

The main object of the present invention is to provide a method for direct solidification and stabilization of liquid wastes containing up to 100,000 mg/L of arsenic.

Another object of the present invention is to provide a technically and economically efficient method of selectively stabilizing high concentration of arsenic up to 100,000 mg/L in liquid wastes into a non-leachable solid material conforming to the USEPA TCLP criteria and ready for final disposal to landfills or containment facilities.

Further another object of the present invention is to simultaneously utilize another waste stream such as "spent high temperature shift catalyst" generated during the production of ammonia in a nitrogenous fertilizer manufacturing complex, in the solidification and stabilization of liquid wastes containing very high concentration of arsenic.

SUMMARY OF THE INVENTION

The present invention deals with a method for direct treatment of liquid wastes containing up to 10% or 100,000 mg/L of arsenic by solidification/stabilization in a relatively cost effective and environmentally safe manner as compared to conventional processes. The method also permits the simultaneous utilization other heavy metal bearing wastes (such as spent catalysts), in the solidification/stabilization of liquid wastes containing very high concentration of arsenic. The present invention further relates to a method for converting liquid wastes containing very high concentration of arsenic into a non-leachable solid residue ready for final disposal. The direct treatment of liquid wastes containing very high concentration of arsenic by solidification/stabilization will eliminate the additional stage of converting liquid wastes to solid or semi-solid form prior to solidification/stabilization, thereby significant reduction in overall cost associated with arsenic waste treatment.

DETAILED DESCRIPTION OF THE INVENTION

Accordingly, the present invention provides a method for direct solidification and stabilization of liquid hazardous wastes containing up to 100,000 mg/L of arsenic, wherein the said method comprising the steps of:

(a) adding 0.04 to 0.05 liters hydrogen peroxide (30% concentration) per liter in liquid waste contaminated with arsenic with continuous mixing;

(b) subsequent adding 0.15 to 0.175 kg of calcium oxide per liter in said waste obtained from step (a) with continuous mixing;

(c) subsequent adding 0.175 to 0.2 kg of ferric sulphate per liter in waste obtained from step (b) with continuous mixing or optionally adding 0.1 to 0.125 kg of additional metal bearing waste in waste obtained from step (b);

(d) subsequent adding of 1.1 to 1.25 kg of portland cement per liter in waste obtained from step (c) with continuous mixing to obtain homogenized slurry;

(e) curing the homogenized slurry obtained from step (d) to get desired solidified and stabilized mass.

In an embodiment of the present invention, the liquid hazardous wastes is collected from the nitrogenous fertilizer manufacturing industry.

In another embodiment of the present invention, the mixing is carried out by any suitable means of agitation for about 10 minutes after the addition of each ingredient. Further in an embodiment of the present invention, the additional metal bearing waste is selected from spent high temperature shift catalyst.

Yet in an embodiment of the present invention, the slurry is cured at 25 to 45 degree C. for at least 7 days.

Still in an embodiment of the present invention, the solidified and stabilized mass formed using the above process meet the stringent USEPA TCLP criteria, making it suitable for final disposal.

The above-described method is particularly advantageous to liquid wastes that contain very high concentration of arsenic (up to 100,000 mg/L) that may store at many production facilities (such as nitrogenous fertilizer complexes) in the world. Overall, the cost of the treatment and disposal of liquid wastes containing very high concentrations of arsenic may be significantly reduced by the application of this invention as it eliminates the intermediate stage of converting the arsenic from liquid phase to solid/semi-solid phase prior to stabilization/solidification.

It is to be understood that the present invention is by no means limited to any particular waste stream (such as spent absorbing solution Giammarco-Vetrocoke process) but also applicable to all other liquid waste streams that contain high concentration (up to 100,000 mg/L) of arsenic. The liquid wastes with even higher concentration of arsenic (more than 100,000 mg/L) can also be directly solidified/stabilized by the method described in the present invention by varying the quantities of various ingredients viz. hydrogen peroxide, calcium oxide, ferric sulphate, cement.

It is the simultaneous utilization of another metal bearing waste streams such as spent high temperature shift catalyst containing iron and chromium which contribute for fixation of arsenic present in the liquid waste.

The following examples are given by the way of illustration and therefore should not be construed to limit the scope of the present invention.

EXAMPLE 1

Tests were conducted with the spent absorbing solution from Giammarco-Vetrocoke process (henceforth referred as spent G-V solution). The two different streams of spent G-V solutions (specific gravity 1.3 and specific gravity 1.34) were characterized for arsenic and other heavy metal content, as per the standard methods for analysis of water and wastewater using an inductively coupled plasma (ICP) method. Table 1 depicts the concentration of arsenic in the two different streams spent G-V solution.

TABLE 1

Results of analysis of two different streams of spent G-V solution used in Example 1

| Metal | Stream #1 (Specific Gravity = 1.3) Concentration (mg/L) | Stream #2 (Specific Gravity = 1.34) Concentration (mg/L) |
|---|---|---|
| Arsenic Total | 85,000 | 100,000 |
| Cadmium | 1.6 | 2.9 |
| Cobalt | 6.9 | 8.7 |
| Chromium | 11.3 | 13.9 |
| Copper | 1.9 | 3.7 |
| Iron | 9.8 | 12.8 |
| Lead | 23.6 | 39.2 |
| Manganese | 0.8 | 1.2 |
| Nickel | 18.7 | 29.4 |
| Zinc | 0.1 | 0.4 |

Laboratory tests were also conducted to characterize the spent high temperature shift catalyst (henceforth referred as spent HT catalyst), which was used as one of the ingredients in the present invention. Table 2 depicts the characteristics of the spent high temperature shift catalyst.

TABLE 2

Characteristic of the spent high temperature shift catalyst

| Metal | Concentration, (mg/g) |
|---|---|
| Arsenic Total | 0.013 |
| Cadmium | 0.05 |
| Cobalt | 0.07 |
| Chromium | 20.8 |
| Copper | 1.09 |
| Iron | 22.5 |
| Lead | 0.1 |
| Manganese | 1.9 |
| Nickel | 0.9 |
| Zinc | 0.2 |

The stabilization and solidification of spent G-V solution (specific gravity 1.3) was carried out by sequential addition of hydrogen peroxide, calcium oxide, ferric sulphate, spent H.T. catalyst and cement). The doses of these ingredients were optimized by conducting a series of laboratory studies. This example details the solidification and stabilization studies carried out at optimum doses of the above-mentioned ingredients.

The solidification/stabilization study was carried out in two sets, with and without addition of spent HT catalyst. For the first set of study, 1 lit of spent G-V solution (specific gravity of 1.3) was taken in a plastic container to which 40 ml of hydrogen peroxide (30% concentration) was added slowly with constant stirring. After 10 minutes interval, 150 gm of calcium oxide was added to the waste with continuous stirring. After 10 minutes interval, 175 gm of powdered ferric sulphate was added to the waste with continuous stirring. After 10 minutes interval, 1100 gm of Portland cement was added to the waste with continuous stirring. After 10 minutes interval, the homogenized slurry was transferred to the mould of 5 cm×5 cm×5 cm size. The stabilized and solidified blocks were cured for 7 days. After 7 days of curing the solidified and stabilized blocks were subjected to unconfined compressive strength and TCLP. The results of the unconfined compressive strength and TCLP for set #1 are presented in Table 3.

In the second set, the solidification and stabilization study described for set # 1 was repeated, except with addition of 100 gm of powdered spent HT catalyst to the waste with continuous stirring after the addition of ferric sulphate and before addition of cement. The results of the unconfined compressive strength and TCLP for set # 2 are presented in Table 4. All the experiments under set # 1 and set # 2 were carried out in triplicate.

TABLE 3

Results of unconfined compressive strength (UCS) and TCLP of the solidified and stabilized blocks prepared in set # 1 (without addition of spent HT catalyst)

| Parameters | Samples Solidified and Stabilized Blocks | | |
|---|---|---|---|
| | Block # 1 | Block # 2 | Block # 3 |
| Unconfined compressive strength ($kg/cm^2$) | 85 | 81 | 88 |
| Concentration of Heavy metals in the TCLP leachate (mg/L) | | | |
| Arsenic Total | 3.8 | 4.1 | 3.28 |
| Cadmium | 0.02 | 0.03 | 0.022 |
| Cobalt | 0.08 | 0.082 | 0.07 |

TABLE 3-continued

Results of unconfined compressive strength (UCS) and TCLP of the solidified and stabilized blocks prepared in set # 1 (without addition of spent HT catalyst)

| Parameters | Samples Solidified and Stabilized Blocks | | |
|---|---|---|---|
| | Block # 1 | Block # 2 | Block # 3 |
| Chromium | 0.05 | 0.06 | 0.02 |
| Copper | 0.09 | 0.097 | 0.06 |
| Iron | 0.19 | 0.22 | 0.13 |
| Lead | 0.23 | 0.19 | 0.24 |
| Manganese | 0.01 | 0.013 | 0.011 |
| Nickel | 0.67 | 0.57 | 0.53 |
| Zinc | BDL | BDL | BDL |

TABLE 4

Results of unconfined compressive strength (UCS) and TCLP of the solidified and stabilized blocks prepared in set # 2 (with addition of spent HT catalyst)

| Parameters | Samples Solidified and Stabilized Blocks | | |
|---|---|---|---|
| | Block # 1 | Block # 2 | Block # 3 |
| UCS (kg/cm$^2$) | 110 | 100 | 105 |
| Concentration of Heavy metals in the TCLP leachate (mg/L) | | | |
| Arsenic Total | 0.57 | 0.7 | 0.62 |
| Cadmium | 0.01 | 0.015 | 0.02 |
| Cobalt | 0.02 | 0.04 | 0.08 |
| Chromium | 1.1 | 1.4 | 1.3 |
| Copper | 0.05 | 0.07 | 0.09 |
| Iron | 1.34 | 1.46 | 1.7 |
| Lead | 0.11 | 0.16 | 0.20 |
| Manganese | BDL | BDL | BDL |
| Nickel | 0.3 | 0.57 | 0.53 |
| Zinc | BDL | BDL | BDL |

EXAMPLE 2

Example 1 (set # 2) was repeated with the another stream of spent G-V solution (specific gravity 1.34) containing higher concentration of arsenic (100,000 mg/L), using higher volume of liquid waste (20 Liters) and using commercial grade hydrogen peroxide, calcium oxide and ferric sulphate. The quantities of hydrogen peroxide (30% concentration), calcium oxide and ferric sulphate, spent HT catalyst and cement were 1 liter, 3.5 kg, 4 kg, 2 kg and 22 kg respectively. The tests under example two were also carried out in triplicate. The resulting stabilized and solidified samples were tested for unconfined compressive strength and TCLP and the results of these tests are presented in Table 5 below.

TABLE 5

Results of unconfined compressive strength (UCS) and TCLP of the solidified and stabilized blocks prepared in Example 2 (spent G-V solution with Sp. Gr. of 1.34)

| Parameters | Samples Solidified and Stabilized Blocks | | |
|---|---|---|---|
| | Block # 1 | Block # 2 | Block # 3 |
| UCS (kg/cm$^2$) | 98 | 94 | 97 |
| Concentration of Heavy metals in the TCLP leachate (mg/L) | | | |
| Arsenic Total | 0.83 | 1.10 | 0.91 |
| Cadmium | 0.03 | 0.06 | 0.05 |
| Cobalt | 0.04 | 0.07 | 0.06 |
| Chromium | 1.5 | 1.8 | 1.6 |
| Copper | 0.08 | 0.09 | 0.08 |
| Iron | 2.6 | 3.2 | 3.1 |
| Lead | 0.09 | 0.2 | 0.17 |
| Manganese | 0.01 | 0.04 | 0.02 |
| Nickel | 0.7 | 1.1 | 0.94 |
| Zinc | 0.02 | 0.07 | 0.06 |

It could be observed from the test results of Example 1 and Example 2 (Table 3, Table and Table 5) that a very high unconfined compressive strength (up to 110 kg/cm$^2$) was achieved by direct solidification and stabilization of liquid waste containing very high concentration arsenic. Further, the stabilized and stabilized block fully meets the TCLP-based USEPA requirements for arsenic (the regulatory TCLP limit for arsenic is ppm) and other heavy metals. The results (Table 4 and Table 5) also indicate that addition of spent HT catalyst to the wastes containing high concentration arsenic further increase the unconfined compressive strength and reduces the concentration of arsenic in TCLP leachate.

ADVANTAGES

The main advantages of the present invention are:

1. Application of solidification and stabilization technology for direct treatment of liquid wastes containing very high concentration of arsenic (up to 100,000 mg/L).
2. The solidification/stabilization of wastes with higher concentrations arsenic (more than 100,000 mg/L) is also possible with suitable changes in quantities of ingredients mentioned in the present invention.
3. Significant cost reduction in the treatment of liquid arsenic wastes can be achieved due to elimination of intermediate treatment stage of transforming arsenic from liquid phase to solid/semi-solid phase prior to solidification and stabilization as practiced conventionally.
4. Simultaneous and successful utilization of another heavy metal bearing waste streams (such as spent high temperature shift catalyst) along with liquid wastes containing very high concentration of arsenic.

We claim:

1. A method for direct solidification and stabilization of liquid hazardous wastes containing up to 100,000 mg/L of arsenic, wherein the method comprises the steps of:

(a) adding between about 0.04 and 0.05 liter of 30% hydrogen peroxide solution per liter to a liquid hazardous waste contaminated with arsenic, with continuous mixing;

(b) subsequent adding between about 0.15 and 0.175 kg of calcium oxide per liter to the waste obtained in step (a), with continuous mixing;

(c) subsequent adding between about 0.175 and 0.2 kg of ferric sulphate per liter to the waste obtained in step (b) with continuous mixing and adding between about 0.07 and 0.1 kg of additional metal bearing waste per 1 kg of the liquid waste to the waste obtained in step (b);

(d) subsequent adding between about 1.1 and 1.25 kg of portland cement per liter to the waste obtained in step (c) with continuous mixing to obtain a homogenized slurry; and (e) curing the homogenized slurry obtained in step (d) to get desired solidified and stabilized mass, wherein the method is carried out in a single vessel, thereby solidifying and stabilizing the liquid hazardous waste.

2. A method according to claim 1, wherein the liquid hazardous waste is a by-product of the process of manufacturing of a nitrogenous fertilizer.

3. A method according to claim 1, wherein the mixing is carried out by agitation for about 10 minutes after the addition of each ingredient.

4. A method according to claim 1, wherein the additional metal bearing waste is selected from spent high temperature shift catalyst.

5. A method according to claim 1, wherein the slurry is cured at a temperature between about 25 and 45 degree C. for at least 7 days.

6. A method for direct solidification and stabilization of liquid hazardous waste containing up to 100,000 mg/L of arsenic, wherein the method is carried out in a single vessel and comprises the steps of:

(a) adding between about 0.04 and 0.05 liter of 30% hydrogen peroxide solution per liter to liquid waste contaminated with arsenic with continuous mixing;

(b) subsequent adding between about 0.15 and 0.175 kg of calcium oxide per liter to the waste obtained in step (a) with continuous mixing;

(c) subsequent adding between about 0.175 and 0.2 kg of ferric sulphate per liter to the waste obtained in step (b) with continuous mixing;

(d) subsequent adding between about 1.1 and 1.25 kg of portland cement per liter to the waste obtained in step (c) with continuous mixing to obtain a homogenized slurry; and (e) curing the homogenized slurry obtained in step (d) to get desired solidified and stabilized mass, thereby solidifying and stabilizing the liquid hazardous waste.

7. A method according to claim 6, wherein the liquid hazardous waste is a by-product of the process of manufacturing of a nitrogenous fertilizer.

8. A method according to claim 6, wherein the mixing is carried out by agitation for about 10 minutes after the addition of each ingredient.

9. A method according to claim 6, wherein the additional metal bearing waste is selected from spent high temperature shift catalyst.

10. A method according to claim 6, wherein the slurry is cured at a temperature between about 25 and 45 degree C. for at least 7 days.

11. A method for direct solidification and stabilization of liquid hazardous waste containing up to 100,000 mg/L of arsenic, wherein the method is carried out in a single vessel and comprises the steps of:

(a) adding between about 0.04 and 0.05 liter of 30% hydrogen peroxide solution per liter to liquid waste contaminated with arsenic with continuous mixing;

(b) subsequent adding between about 0.15 and 0.175 kg of calcium oxide per liter to the waste obtained in step (a) with continuous mixing;

(c) subsequent adding between about 0.175 and 0.2 kg of ferric sulphate per liter to the waste obtained in step (b) with continuous mixing;

(d) subsequent adding between about 1.1 and 1.25 kg of portland cement per liter to the waste obtained in step (c) with continuous mixing to obtain a homogenized slurry; and (e) curing the homogenized slurry obtained in step (d) to get desired solidified and stabilized mass, with the further proviso that the concentration of arsenic in the liquid hazardous waste is higher than about 85,000 mg/L, thereby solidifying and stabilizing the liquid hazardous waste.

12. A method according to claim 11, wherein the liquid hazardous waste is a by-product of the process of manufacturing of a nitrogenous fertilizer.

13. A method according to claim 11, wherein the mixing is carried out by agitation for about 10 minutes after the addition of each ingredient.

14. A method according to claim 11, wherein the additional metal bearing waste is selected from spent high temperature shift catalyst.

15. A method according to claim 11, wherein the slurry is cured at a temperature between about 25 and 45 degree C. for at least 7 days.

* * * * *